(12) United States Patent  
Bajuyo

(10) Patent No.: US 8,931,669 B2
(45) Date of Patent: Jan. 13, 2015

(54) BELT CLIP FOR A CONTAINER

(71) Applicant: Antonio Bajuyo, South Bend, IN (US)

(72) Inventor: Antonio Bajuyo, South Bend, IN (US)

( * ) Notice: Subject to any disclaimer, the term of this patent is extended or adjusted under 35 U.S.C. 154(b) by 0 days.

(21) Appl. No.: 14/212,047

(22) Filed: Mar. 14, 2014

(65) Prior Publication Data
US 2014/0263501 A1    Sep. 18, 2014

Related U.S. Application Data

(60) Provisional application No. 61/793,342, filed on Mar. 15, 2013.

(51) Int. Cl.
A45F 5/00    (2006.01)
B44D 3/14    (2006.01)
A45F 5/02    (2006.01)

(52) U.S. Cl.
CPC . *B44D 3/14* (2013.01); *A45F 5/021* (2013.01); *Y10S 224/904* (2013.01)
USPC ............. 224/148.4; 224/148.7; 224/183; 224/666; 224/677; 224/678; 224/242; 224/904

(58) Field of Classification Search
CPC ................................. A45F 5/021; B44D 3/14
USPC ........... 224/148.4, 148.7, 183, 191, 660, 666, 224/667, 676, 677, 678, 242, 249, 904
See application file for complete search history.

(56) References Cited

U.S. PATENT DOCUMENTS

| 2,985,349 | A | * | 5/1961 | McGuire | 224/268 |
| 2,987,231 | A | * | 6/1961 | Lewis | 224/148.4 |
| 2,995,281 | A | * | 8/1961 | Dixon | 224/148.4 |
| 3,131,900 | A | * | 5/1964 | Anderson et al. | 248/210 |
| 3,239,181 | A | * | 3/1966 | Ellerbrock | 248/210 |
| 3,246,867 | A | * | 4/1966 | Ewing | 248/210 |
| 3,285,482 | A | * | 11/1966 | Bedsaul, Sr. | 224/268 |
| 4,036,463 | A | * | 7/1977 | Hopkins et al. | 248/210 |
| 4,172,542 | A | * | 10/1979 | Lankford | 224/148.7 |
| 4,325,503 | A | * | 4/1982 | Swinney | 224/148.6 |
| 4,433,801 | A | * | 2/1984 | Swinney | 224/148.4 |
| 4,527,720 | A | * | 7/1985 | Hayes | 224/148.4 |
| D286,949 | S | * | 12/1986 | Hardman | D3/229 |
| D296,268 | S | * | 6/1988 | Bozarth | D3/229 |
| 4,919,317 | A | * | 4/1990 | Luedtke | 224/576 |
| 4,972,982 | A | * | 11/1990 | Harbour | 224/270 |
| 5,016,791 | A | * | 5/1991 | Burow | 224/148.6 |

(Continued)

FOREIGN PATENT DOCUMENTS

WO    WO 9826943 A1 * 6/1998

*Primary Examiner* — Justin Larson
(74) *Attorney, Agent, or Firm* — R. Tracy Crump

(57) ABSTRACT

A belt clip for supporting a paint container from a user's waist belt while allowing the painter spill free freedom of movement and secure means for stowing a paint brush. The belt clip has an integral body configured to have an elongated back, a neck extending outward from the proximal end of the back, a head, and a magnet embedded in the head. The belt clip is configured to have a recessed channel for receiving the bail of the paint can and a separate integral hook part for supporting a paint container having a peripheral lip. The back is configured to allow the belt clip to pivot slightly side to side about the wearer thereby accommodating a limited range wearer movement. The magnet allows a user to secure a paint brush to belt clip so that the bush is oriented directly over the open paint can, thereby reducing inadvertent painting errors and messes.

5 Claims, 5 Drawing Sheets

(56) References Cited

U.S. PATENT DOCUMENTS

| | | | |
|---|---|---|---|
| 5,072,868 A * | 12/1991 | Dickie et al. | 224/584 |
| 5,377,863 A * | 1/1995 | Widman | 220/696 |
| 5,489,051 A * | 2/1996 | Robinson | 224/148.4 |
| 5,490,618 A * | 2/1996 | Davidson | 224/148.4 |
| D368,158 S * | 3/1996 | Dancyger et al. | D3/215 |
| 5,497,921 A * | 3/1996 | Dancyger et al. | 224/148.6 |
| D370,559 S * | 6/1996 | Arndt | D3/229 |
| 5,730,339 A * | 3/1998 | Stolfo | 224/148.6 |
| 5,915,606 A * | 6/1999 | Jensen | 224/148.6 |
| 6,006,966 A * | 12/1999 | Voisin, Jr. | 224/148.4 |
| 6,045,017 A * | 4/2000 | Connell | 224/148.7 |
| 6,338,459 B1 * | 1/2002 | Biggs | 248/210 |
| 6,557,738 B1 * | 5/2003 | Meintzer | 224/148.7 |
| 6,719,178 B1 * | 4/2004 | Taylor | 224/148.7 |
| D499,553 S * | 12/2004 | Millard | D3/327 |
| 6,863,191 B2 * | 3/2005 | Kesling | 220/697 |
| 6,866,172 B2 * | 3/2005 | Shackelford | 224/148.4 |
| 6,945,440 B1 * | 9/2005 | Ford | 224/148.6 |
| 7,204,395 B2 * | 4/2007 | Gallagher | 224/192 |
| 8,225,975 B2 * | 7/2012 | MacNaughton | 224/668 |
| 8,381,953 B2 * | 2/2013 | Vennemeyer | 224/192 |
| 8,418,309 B1 * | 4/2013 | Williams | 15/257.06 |
| 8,505,788 B2 * | 8/2013 | Thibault | 224/148.7 |
| 8,556,116 B2 * | 10/2013 | Bergman et al. | 220/770 |
| 8,783,538 B1 * | 7/2014 | Dattilo | 224/673 |
| 2003/0024959 A1 * | 2/2003 | Armstrong | 224/148.4 |
| 2003/0089748 A1 * | 5/2003 | Whalen et al. | 224/148.4 |
| 2005/0161479 A1 * | 7/2005 | Licsko | 224/270 |
| 2008/0272269 A1 * | 11/2008 | Moravsky et al. | 248/692 |
| 2008/0308589 A1 * | 12/2008 | Graham | 224/191 |
| 2011/0253759 A1 * | 10/2011 | Scalese et al. | 224/660 |
| 2012/0037634 A1 * | 2/2012 | Kiceniuk et al. | 220/495.02 |

\* cited by examiner

BELT CLIP FOR A CONTAINER

This application claims the benefit of U.S. Provisional Application No. 61/793,342 filed Mar. 15, 2013, the disclosure of which is hereby incorporated by reference.

This invention relates to a belt clip for supporting a container from a wearer's belt and in particular a belt clip for supporting a paint container having a pivotal bail.

BACKGROUND AND SUMMARY OF THE INVENTION

Paint is readily available in one gallon paint cans or larger containers that have a thin pivoting wire bail. Painters that use brushes often dip directly from the one gallon paint cans rather than transfer paint to small containers. Holding and carrying a one gallon paint can while dipping the brush can cause fatigue, especially when the bail provided on the bucket is a relatively thin metal wire.

The present invention provides a belt clip that allows the painter to support a paint container from a waist belt while allowing the painter spill free freedom of movement and secure means for stowing a paint brush. In various embodiments of this invention, the belt clip has an integral body configured to have an elongated back, a neck extending outward from the proximal end of the back, a head, and a magnet embedded in the head. The belt clip is configured to have a recessed channel for receiving the bail of the paint can and a separate integral hook part for supporting a paint container having a peripheral lip. The back is configured to allow the belt clip to pivot slightly side to side about the wearer thereby accommodating a limited range of wearer movement. This degree of side to side play provides a limited pendulum motion and helps keep the paint in the paint container generally level during normal use where the wearer may reasonably move and bend through various postures, positions and painting activities. The magnet allows a user to secure a paint brush to the belt clip so that the brush is oriented directly over the open paint can, thereby reducing inadvertent painting errors and messes.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
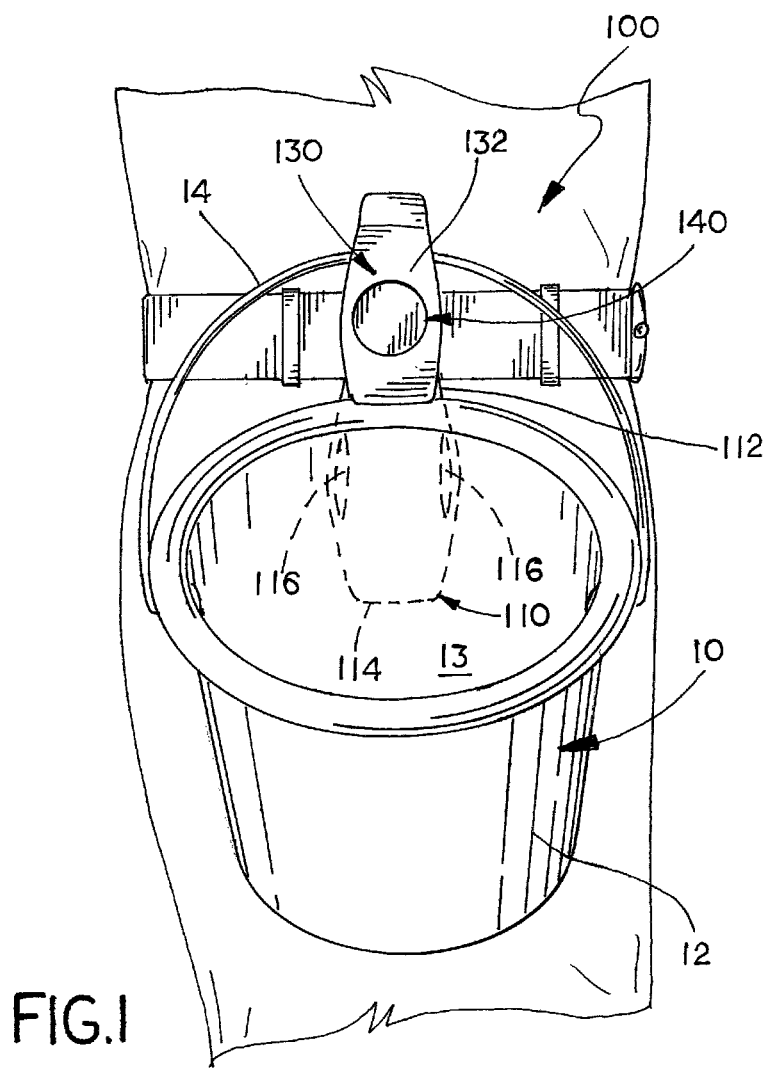
FIG. 1 is a front view of an embodiment of the belt clip of this invention supporting a conventional paint can from a user's waist belt.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The drawings illustrate two different embodiments of the belt clip of this invention. Each embodiment of the belt clip allows the user to suspend paint containers from a user's waist belt and is adapted and configured for use with a variety of paint containers, such as paint cans having pivotal wire bails and other specialized paint containers. Each embodiment also affords the wearer freedom of movement while maintaining the paint container in a relatively level orientation to prevent paint spills.

FIGS. 1-4 show an embodiment of the belt clip of this invention, which is designated generally as reference numeral 100. Belt clip 100 is illustrated in use with a conventional paint can 10 having a cylindrical body 12 with a round open top 13 and a pivotal wire bail 14. Belt clip 100 is generally molded or formed from a suitable plastic for durability and low weight. Belt clip 100 has an integral body configured to have an elongated back 110, a neck 120 extending outward from the proximal end of the back, a head 130, and a magnet 140 embedded in the head.

Figure 2:
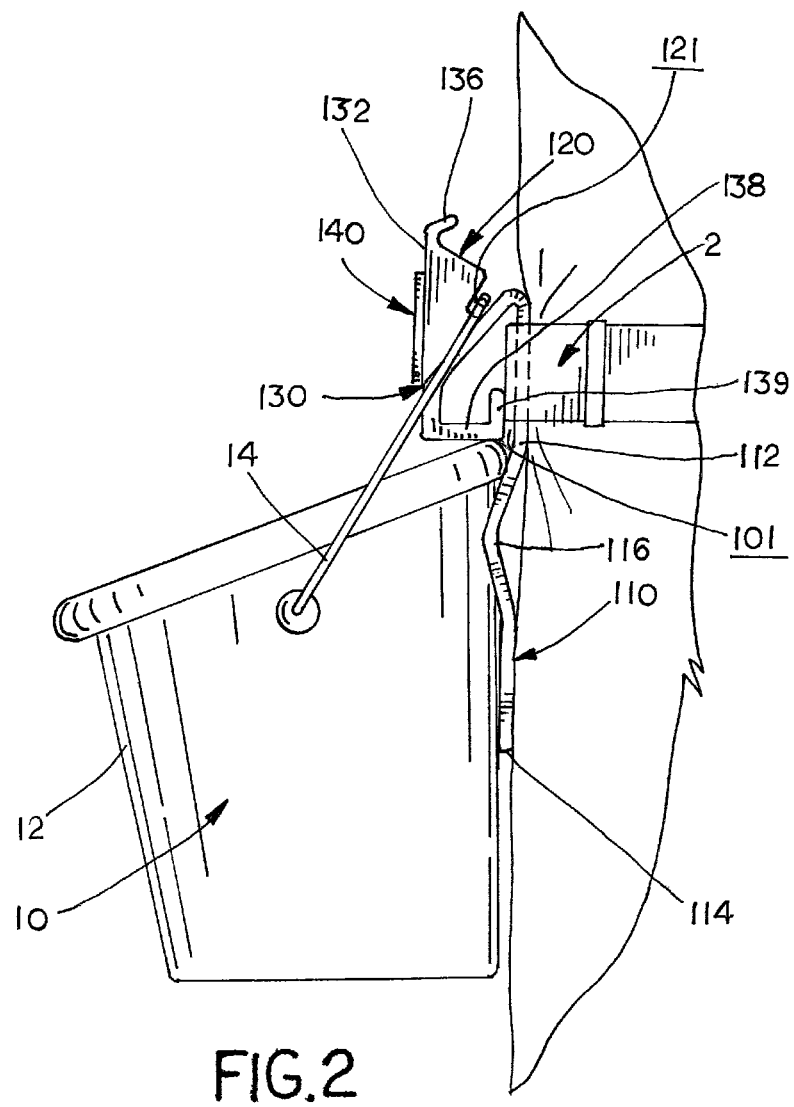
FIG. 2 is a left side view of the belt clip of FIG. 1.
Figure 3:
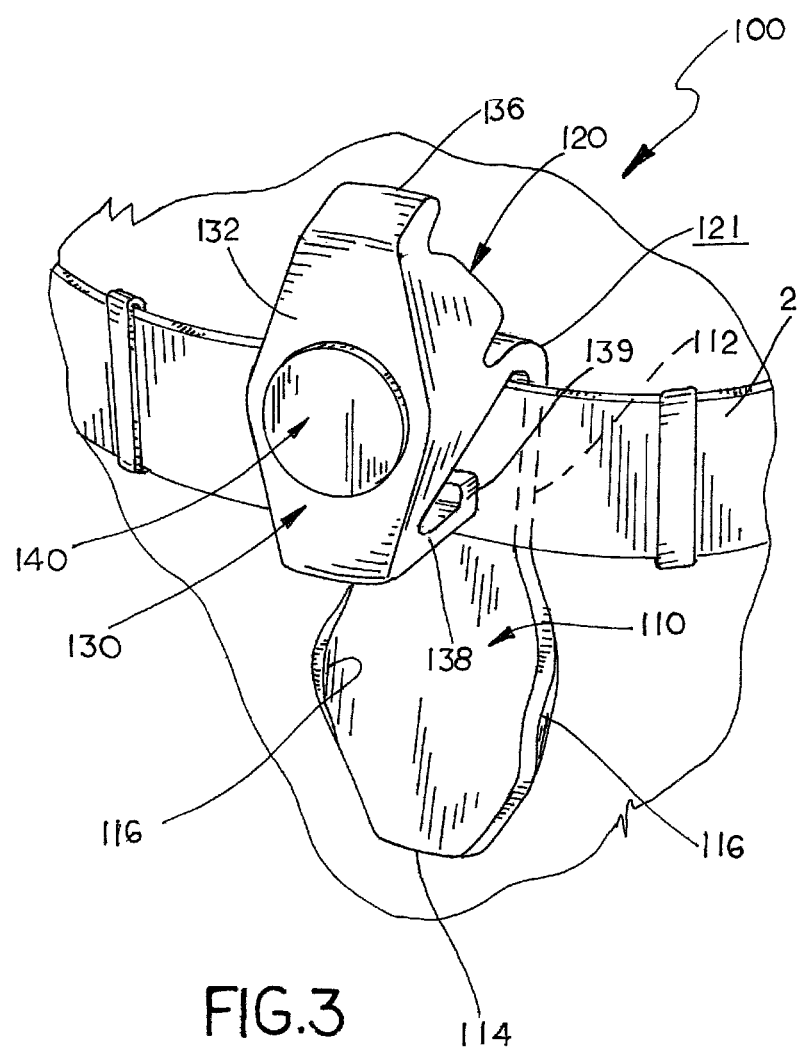
FIG. 3 is a partial side view of the belt clip of FIG. 1.
Figure 4:
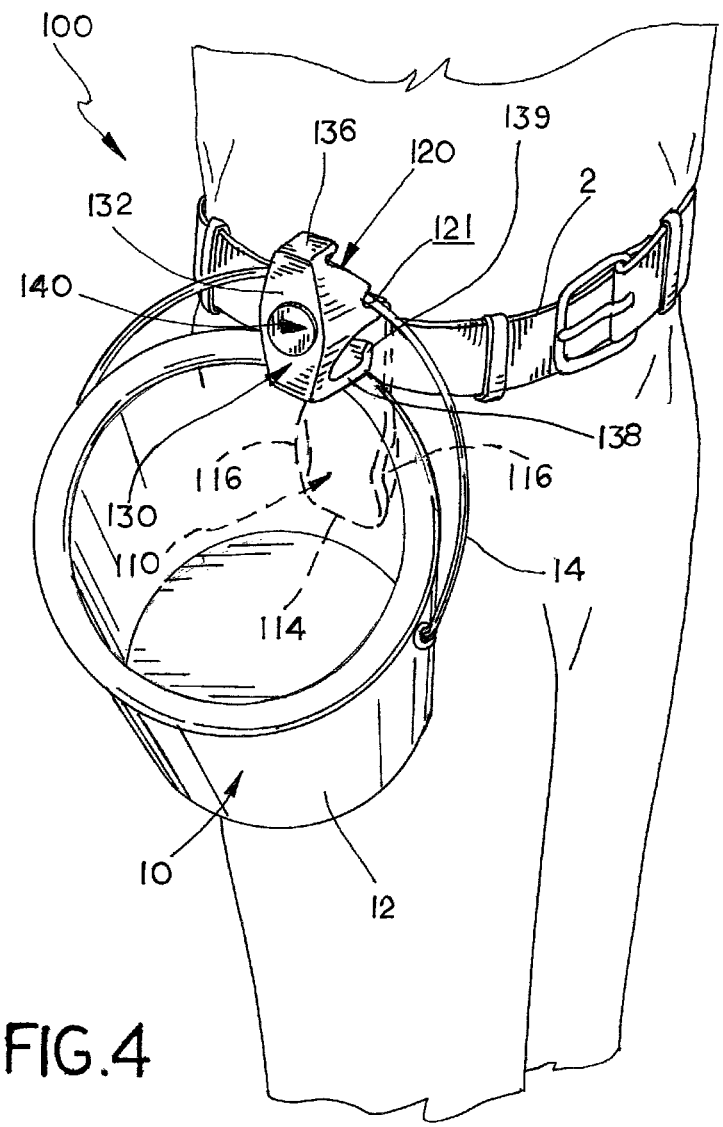
FIG. 4 is a partial top view of the belt clip of FIG. 1 supporting a conventional paint can from a user's waist belt.

Back 110 has a relatively thin body adapted to securely seat under a wearer's belt or inside a wearer's pants pocket. Back 110 has a relatively narrow rectangular proximate end 112 that diverges into a wider diamond shaped distal end 114. Back 110 has an inner back surface 111 and outer back surface 113 adapted to abut against and conform to the wearer's body and fit beneath a waist belt. Back 110 is also configured so that the opposed side corners of the diamond shaped distal end 114 are out turned away from inner back surface 11 to form winged shaped protrusions 116. Distal end 114 is shaped to slip smoothly into a wearer's pant pocket Neck 120 integrally protrudes from inner back surface 111 at proximal end 112 of back 110. Neck 120 has a recessed channel 121 for receiving the bail of a paint can 10. As shown in FIG. 2, bail channel 121 extends across the surface of neck 120 adjacent the proximal end 112 of back 110 at an angle away from the longitudinal axis of back 110. Channel 121 is also configured to receive bail 14 in a snap-fit engagement so that the bail is securely seated within the channel.

Head 130 extends integrally from neck 120 spacing the head from back 110. Head 130 has a flat elongated hexagonal outer head surface 132 that is generally parallel to back 110. The proximal end of head 130 terminates in hook part 136 and the distal end terminates in protrusion 138 that extends from the backside of head 130 towards back 110. Hook part 136 extends from head 130 at an angle away from outer head surface 136. Protrusion 138 extends from the back of head 130 away from outer head surface 136. Protrusion 139 terminates in a hooked finger 139. Finger 139 is spaced from inner surface 111 of back 110 to create a gap 101 through which belt 2 is received.

Magnet 140 is typically a conventional permanent magnet of sufficient size and magnetism to hold a conventional paint brush to belt clip 100. Magnet 140 is typically embedded into the material of head 130, but may be bonded or fastened directly to head outer surface 132 by adhesives or fasteners. Magnet 140 allows a user to secure a paint brush to belt clip 100 so that the brush is oriented directly over the open paint can, thereby reducing inadvertent painting errors and messes.

In use, bail 14 of paint can 10 seats within bail recess channel 121 formed in neck 120 and can body 12 nests between wings 119 of clip back 110. The side of container 12 rests snuggly between protrusions 116 to limit erratic movement of paint can 10. Protrusion 116 also help prevent belt clip 100 from inadvertently riding up under belt 2 during use. It should be noted that proximal end 112 of back 110 is relatively narrow compared to distal end 114 of back 110 to allow belt clip 100 and paint can 10 to pivot slightly side to side about the wearer thereby accommodating a limited range of wearer movement. This degree of side to side play created by the narrow proximal end 112 of back 110 provides a limited pendulum motion and helps keep the paint in paint can 10 generally level during normal use where the wearer may reasonably move and bend through various postures, positions and painting activities.

Figure 5:
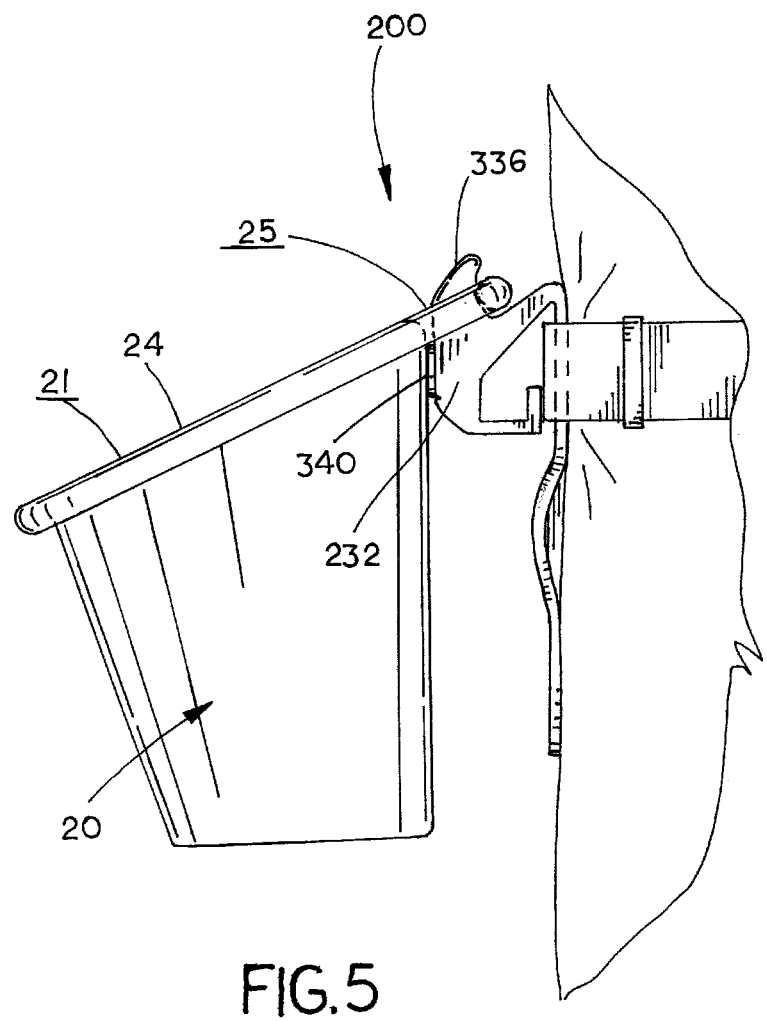
FIG. 5 is a left side view of a second embodiment of the belt clip of this invention supporting an alternative paint container.

FIG. 5 shows another embodiment of the belt clip of this invention, which is designated as reference numeral 200. Belt clip 200 is similar in function and configuration to belt clip 100 described above, but has a hook 336 adapted for use with a specialized paint container 20. As shown, paint container 20 has a vessel body 22 and a contour peripheral lip 24 extending around the open mouth 21 of the container. Container 20 is also configured to have a handle opening 25 at one or more locations around lip 24. Hook 336 is configured to insert into the handle opening 25 and create a friction lock fit with container lip 24. Alternatively or additionally, container 20 may have a steel, or similar suitable material, plate mounted to the side of the vessel body 22, which is located to mate to outer head surface 232 and be held by magnet 340 to affix paint container 20 to belt clip 200.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A belt clip suspending a container from a user's waist belt where the container has a container body with an open mouth and a pivoting bail, the belt clip comprising:
    an elongated back adapted to seat under a wearer's belt and having a proximal end and a distal end;
    a neck integrally extending from the proximal end of the back, the neck having a recessed channel defined therein for receiving the bail of the container, the distal end of the back adapted to restrictively receive the container body when the container is suspended from the belt by the belt clip; and
    a head integrally extending from the neck and spaced from the back so that the head overlies the open mouth of the container when the container is suspended from the belt by the belt clip, wherein the head includes a protrusion extending the head towards the back, the protrusion terminating in a finger spaced from the back to create a gap through which the belt is received when the belt clip is fitted to the belt.

2. The belt clip of claim 1 wherein the proximal end of the back is narrower than the distal end of the back so as to allow the belt clip to pivot slightly side to side relative to the belt when the belt clip is fitted to the belt.

3. The belt clip of claim 1 wherein the distal end of the back has a pair of spaced protrusions adapted to restrictively receive the container body when supported by the belt clip.

4. The belt clip of claim 1 and a magnet affixed to the head.

5. The belt clip of claim 1 wherein the head includes a hook part adapted for connectively mating with the container.

\* \* \* \* \*